Figure 1:
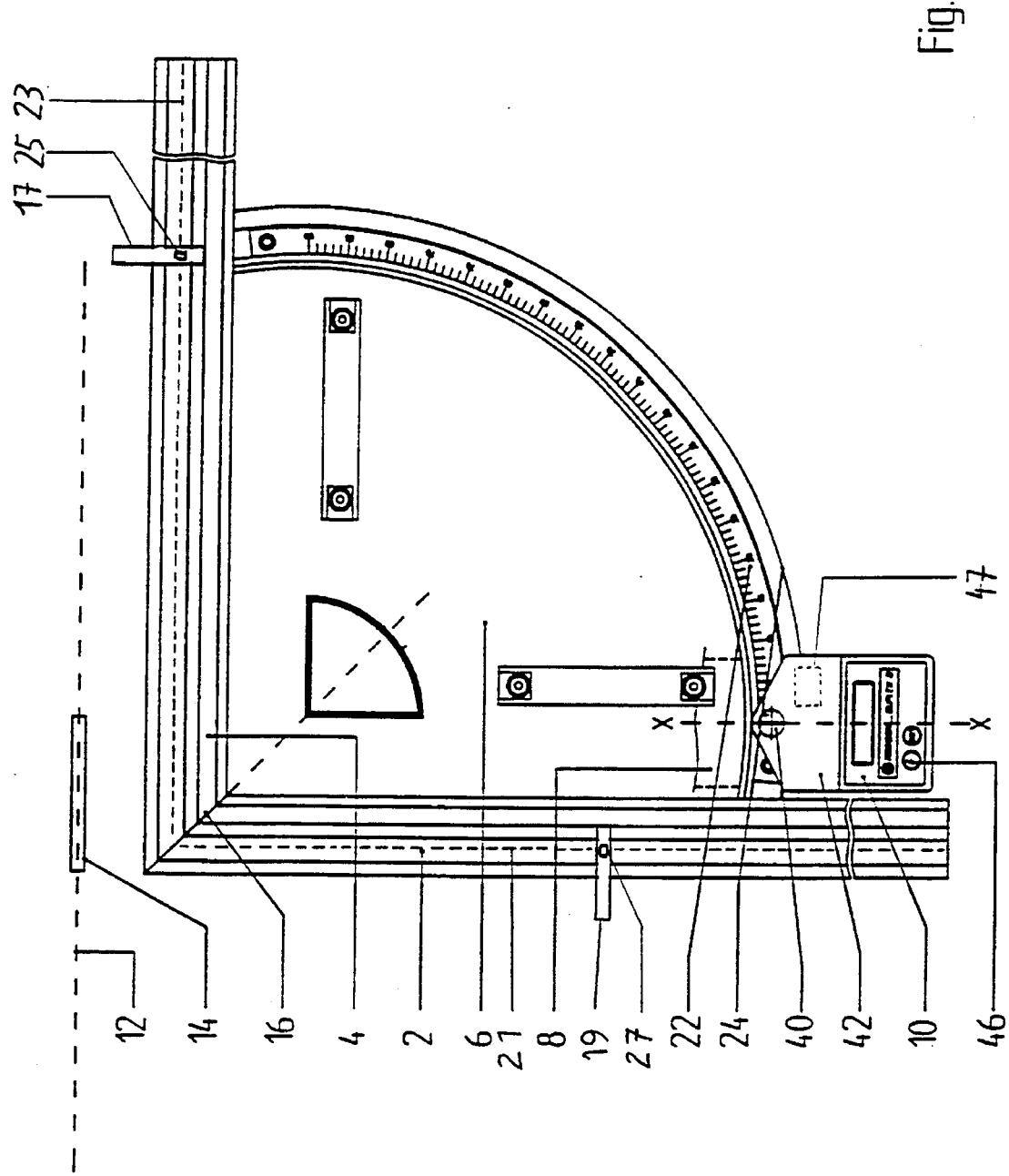

United States Patent [19]
Moeres

[11] Patent Number: 5,566,603
[45] Date of Patent: Oct. 22, 1996

[54] DOUBLE-SIDED MITER BOX FOR MACHINE TOOLS IN PARTICULAR PANEL SAWS

[76] Inventor: Reiner Moeres, Sielstr. 17, D-32549 Bad Oeynhausen, Germany

[21] Appl. No.: 362,485
[22] PCT Filed: Apr. 28, 1994
[86] PCT No.: PCT/EP94/01336
  § 371 Date: Jan. 4, 1995
  § 102(e) Date: Jan. 4, 1995
[87] PCT Pub. No.: WO94/25230
  PCT Pub. Date: Nov. 10, 1994

[30] Foreign Application Priority Data
  May 4, 1993 [DE] Germany ............... 9306681 U

[51] Int. Cl.⁶ .................................................. B26D 7/01
[52] U.S. Cl. ................... 83/468.3; 83/522.18; 83/581
[58] Field of Search .................... 83/522.18, 468.3, 83/581, 437; 33/708, DIG. 1, 534

[56] References Cited

U.S. PATENT DOCUMENTS

| | | | |
|---|---|---|---|
| 4,158,320 | 6/1979 | Kay | 83/425 |
| 4,459,750 | 7/1984 | Affa | 33/708 |

FOREIGN PATENT DOCUMENTS

| | | | |
|---|---|---|---|
| 8803475 | 7/1988 | Germany | G01B 3/56 |
| 9103189 | 7/1991 | Germany | B23D 47/04 |
| 9207811 | 2/1993 | Germany | B23D 47/04 |
| 2008256 | 5/1979 | United Kingdom | 33/708 |

Primary Examiner—Kenneth E. Peterson
Attorney, Agent, or Firm—Schweitzer Cornman & Gross

[57] ABSTRACT

A double-sided miter box for a panel saw machine tool has two interconnected contact rails which can be moved relative to a driven tool. The contact rails are pivotable about a rotation axis. An electrical measurement transducer system which may include a magnetically coded tape and a non-contact sensor, which measures and displays the pivoting cycle of the contact rails.

14 Claims, 3 Drawing Sheets

DOUBLE-SIDED MITER BOX FOR MACHINE TOOLS IN PARTICULAR PANEL SAWS

The invention relates to a double-sided miter box for machine tools, in particular for panel saws, comprising two contact rails, which can be moved relative to the driven tool and which are connected to one another, so as to enclose a right angle between them, and which are both mounted pivotably about a rotation axis disposed on an angle bisector near the tool, as well as an electrical measurement transducer for measuring and a display for indicating the pivoting angle of the contact rails relative to a tool plane.

Such miter boxes are mainly used for cutting at an angle wooden or plastic boards and laths on panel saws. Due to the double sided design, workpieces of different widths can easily be cut, so as to form a miter in such a way that the cut surfaces have the same lengths (German Patent 236 451).

To adjust the pivoting angle and thus the cutting angle, the prior art uses indicator scales and electrical measuring systems, the latter, for example, in the form of a rotary potentiometer disposed near the rotation axis. The pivoting angle is sensed mechanically and operation is effected by means of a gear, which steps up the rotation. This system has the disadvantage that a high accuracy of fit is relatively expensive to attain and that the mechanical parts are rather sensitive.

In some cases, the length is also adjusted for adjusting a suitable cutting angle. This is done by moving contact flaps on the contact rails. The difficulty then arises that the distance between a contact flap and the saw blade changes while the pivoting angle is being adjusted. This is due to the circumstance that the rotation axis of the contact rails is disposed at a distance from the plane of the tool. The distance measuring systems, which are usually situated at the contact rails for adjusting and indicating the distance of a contact flap from the saw blade, consequently are only suitable for indicating the true distance for a particular pivoting angle. As a result, the correct length of the workpiece at different miter angles can be obtained only by manually moving a contact flap on the basis of trial and error.

It is consequently an object of the invention to specify a miter box such that the pivoting angle can be measured and indicated easily and reliably and such that workpieces of different lengths can be produced simply and quickly for different pivoting angles.

With a miter box of the type mentioned in the introduction, the inventive solution of this problem is that the electric measurement transducer consists of a magnetically coded measuring tape, which is disposed about the rotation axis along a graduated circle, and of a sensor, which senses the measuring tape without contact, the value measured by this sensor being indicated on the display as an angular measurement of the pivoting angle.

The electrical measurement transducer of an inventive miter box has no mechanical elements that are prone to trouble, and consequently is especially reliable. Furthermore, no step-up gear is needed to increase the resolution, since, by means of a coded measuring tape disposed along the graduated circle, an especially accurate measurement is achieved and the accuracy can be increased by enlarging the radius of the graduated circle. Because the measuring tape is sensed by the sensor without contact, wear phenomena are avoided.

The magnetically coded measuring tape advantageously is attached along the graduated circle, to a surface extending perpendicularly relative to a plane stretched between the contact rails, because the measuring tape, which usually has the form of a flat, flexible strip, can be laid very easily and without mechanical bending stresses on a graduated circle and thus is protected against depositions of dust.

An advantageous embodiment of a miter box with a protrusion thereon, said protrusion being non-pivotable with respect to the tool plane, is one wherein the display and the sensor, which senses the measurement tape, are disposed at one end of the protrusion. Because of the small distance, the display can easily be read by the operating personnel and the sensor is disposed near the display, so that only short signal lines are needed.

Especially advantageous is a miter box with at least one contact flap, which is mounted so as to be movable lengthwise but fixable on a contact rail, and with a contact flap having a sensor fastened to it, which senses without contact a measuring tape attached along the contact rail and which is connected electrically to the display, on which the position of the contact flaps relative to the contact rails can be indicated, because a value thus is available for the relative adjustment of the contact flap and thus of the workpiece length.

Especially advantageous is an embodiment such that the length specification taken from the measurement tape of the contact rail is corrected in a computer by means of the angular specification taken from the measuring tape that is disposed along the graduated circle in such a fashion, that the display indicates the actual distance of the contact flap from the tool. In this way, the operating personnel can very easily adjust the desired workpiece length for arbitrary pivoting angles by moving the contact flap, since the actual distance of the contact flap from the tool, which depends on the pivoting angle, is indicated on the display. The inventive miter box obviates the difficult adjustment of the distance by trial and error, such as is needed according to the prior art.

Another advantageous embodiment is characterized in that each contact flap can be moved on the contact rail by means of an electrical step motor, so that a manual movement of the contact flap is obviated. It is advantageous if the specification of the distance of the contact flap from the tool can be entered into the computer and is processed in the computer by means of the angular specification taken from the sensor, which is disposed along the graduated circle, and if said computer delivers a signal to the step motor, so that, in any pivoted position of the contact rails, the contact flap can be moved to the inputted value of the distance of the contact flaps from the tool. Thus, operation becomes especially convenient because the contact flaps are automatically moved when the contact rails are pivoted and thus exact workpiece lengths are achieved. This embodiment is developed further in that a numerical keyboard is disposed at the display, by means of which the value of the distance of the contact flap from the tool can be entered manually into the computer.

According to a further development of the invention, a quarter-circle plate is rigidly connected between the contact rails. A rigid connection is thus made between the contact rails. The measuring tape can be fastened thereon and, in addition, an angle scale can be provided along the quarter-circle plate. This further development is improved by a friction wheel, which can be operated manually, is mounted on the protrusion, which cannot be pivoted relative to the tool plane and which engages a portion of the quarter-circle plate in positive or non-positive fashion, so that the pivoting angle of the contact rails can be adjusted exactly by rotating the friction wheel. This results in precise workpiece dimensions.

If the contact rails can be fixed at every adjusted pivoting angle by clamping means, operating convenience is enhanced even further.

It is also advantageous if the computer and the display unit are accommodated in a common housing, in order to decrease manufacturing costs.

A further development of the invention provides that the electrical and electronic components of the miter box be supplied with electrical power from a battery. Consequently, the entire miter box can be put into operation simply after a panel saw is mounted on a truck without the need for providing an external power supply.

Advantageously, the display can be switched from angular dimensions to length dimensions, in order to minimize manufacturing costs.

Figure 2:
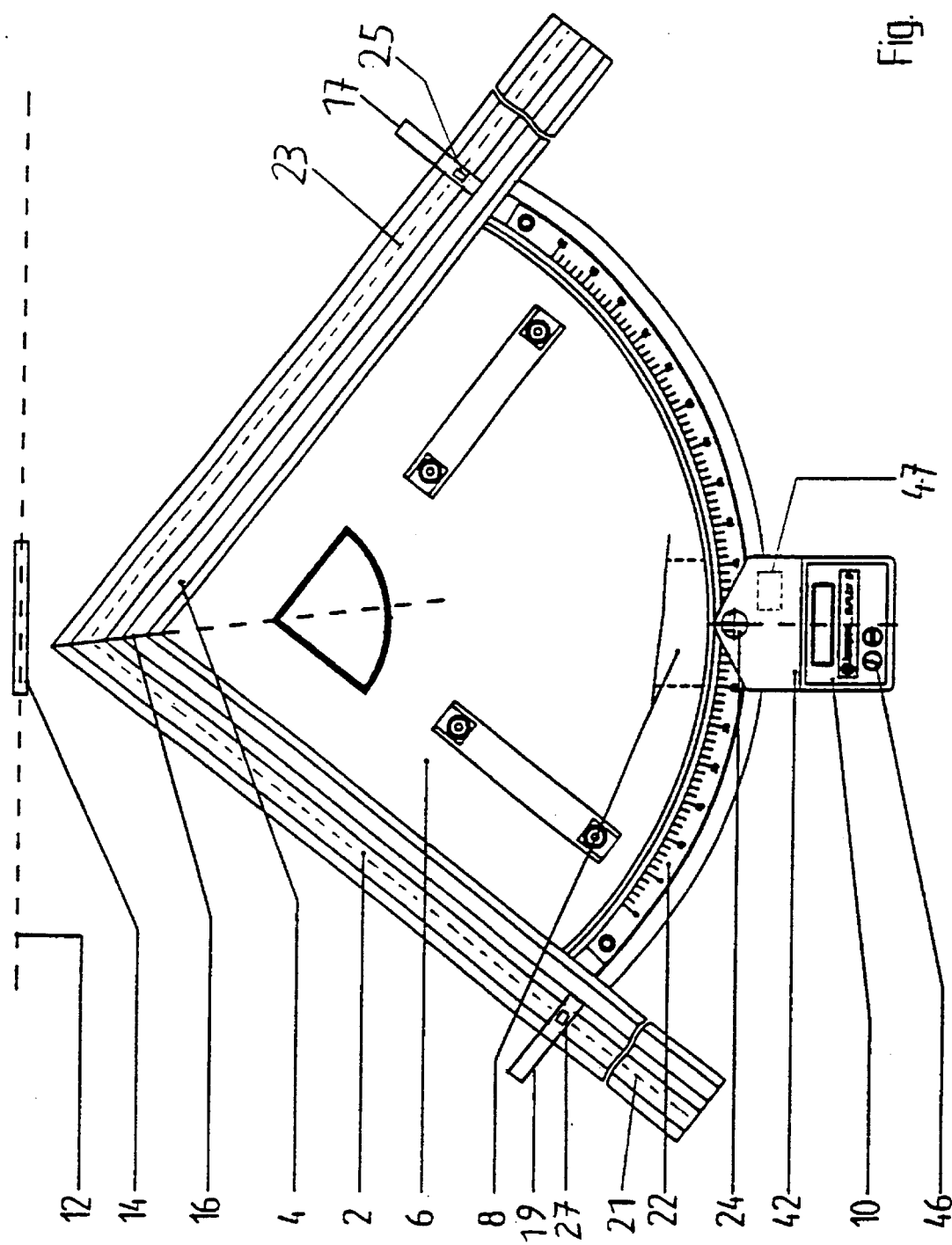
Figure 3:
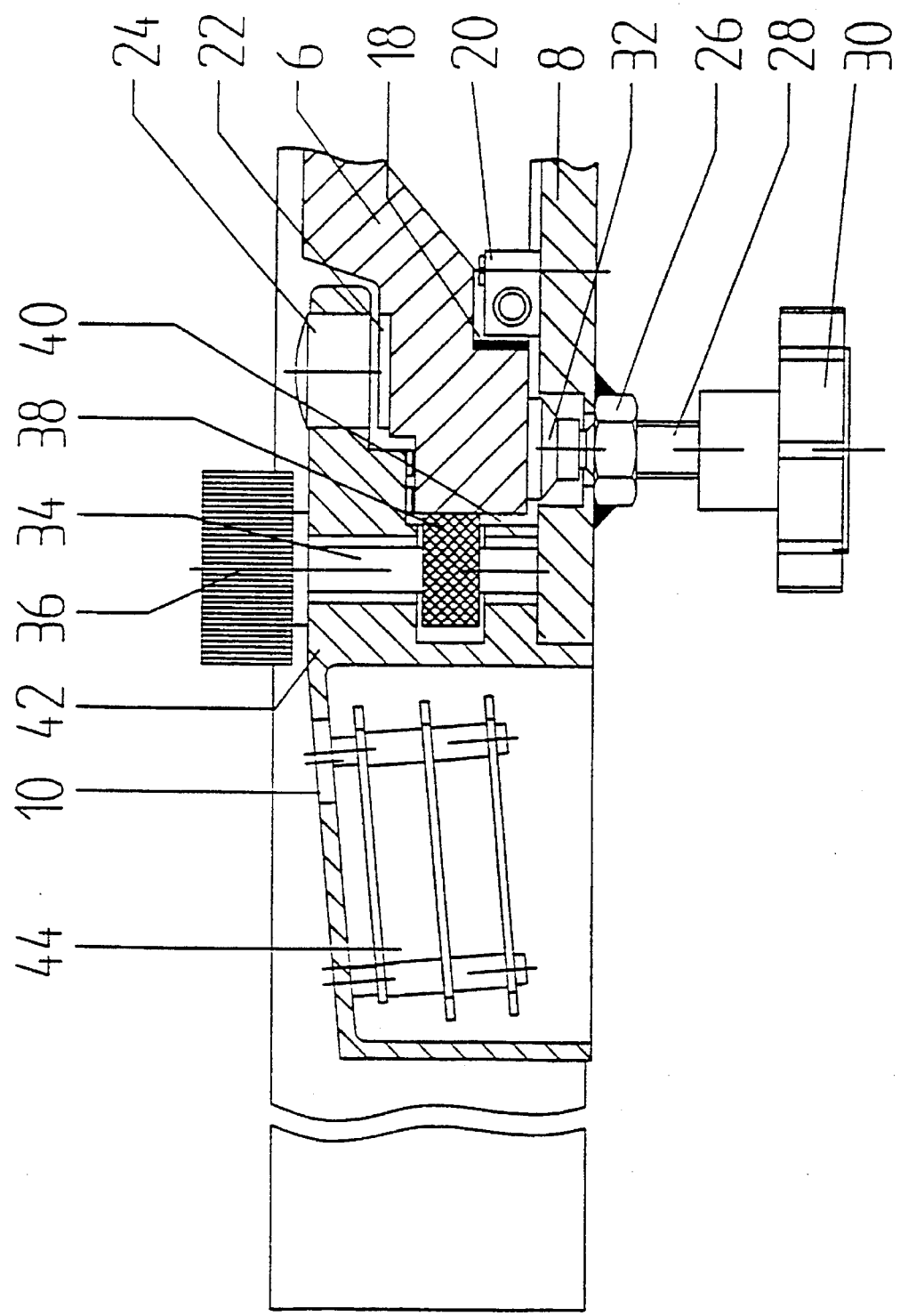

The present invention is described below, by way of example, with reference to the attached drawings, in which FIG. 1 shows a double-sided miter box with a quarter-circle plate and with a display as well as a tool in the form of a saw blade, lying in a tool plane, the representation being a plan view, FIG. 2 shows the miter box of FIG. 1 in a pivoted position, FIG. 3 shows a sensor, which senses the measuring tape without contact, a clamping means to fix an adjusted pivoting angle and a display with a computer, as a sectional representation that is identified in FIG. 1 by X—X.

The inventive embodiment of a miter box shown in FIGS. 1 and 2 essentially comprises two contact rails 2 and 4 disposed at a right angle to one another and a quarter-circle plate 6 disposed between the two contact rails 2, 4 and rigidly connected to them, as well as a non-pivotable protrusion 8, which is disposed below the quarter-circle plate 6 and on one end of which a display 10 in a housing 42 is mounted. The miter box 1 is fastened on a truck of a panel saw. The truck can be moved relative to a saw blade 14, which lies in a tool plane 12. The truck can be moved manually parallel to the tool plane 12. Alternatively, the miter box 1 could be attached to a stationary part of the panel saw and the saw blade 14 could be movable in the tool plane 12.

The contact rails 2, 4, together with the quarter-circle plate 6, are mounted by ball bearings on a part of the non-pivotable protrusion 8 in such a way, that they can be pivoted about the rotation axis 16, relative to the tool plane 12. The rotation axis 16 is disposed between the contact rails 2, 4 near the saw blade 14, on an angle bisector, so as to be perpendicular to a plane, which is stretched between the contact rails 2, 4.

Contact flaps (17, 19) can be mounted on the contact rails 2, 4 in well-known fashion, so as to be longitudinally movable but fixable. The workpieces being processed can be caused to make contact with these contact flaps, so as to achieve the desired workpiece length. Magnetically coded measuring tapes 21, 23 are affixed along the contact rails 2, 4. These measuring tapes are sensed without contact by the sensors 25, 27 that are fastened to the contact flaps. An electrical signal is generated in one sensor, this signal being a measure of the relative position of a contact flap with respect to the contact rail. The signal can be displayed with the help of an electric lead on the display 10 in the form of a length specification. In addition, a conventional measuring tape can be fixed to the contact rails 2, 4.

FIG. 2 shows the contact rails 2, 4 in a pivoted position, while the protrusion 8 and the display 10 assume an unchanged position.

An electrical measurement transducer to measure and indicate the pivoting angle on the display 10 is described with the help of FIGS. 2 and 3. It consists essentially of a magnetically coded measuring tape 18, disposed about the rotation axis 16 along a graduated circle, and of a sensor 20, which senses the measuring tape without contact. The flexible measuring tape 18 has a rectangular cross section and is attached to a surface, which runs perpendicular to a plane stretched between the contact rails 2, 4. The perpendicularly extended surface is part of the underside of the quarter-circle plate 6, so that the measuring tape 18 is protected against external influences or deposits, for example, of dust. The sensor 20 is screwed onto one end of the non-pivotable protrusion 8, at a small distance from the measuring tape 18. Over an electric lead, which is not shown here, the sensor 20 delivers a signal to the display 10, which indicates the measurement value of the sensor 20 as an angular measure of the pivoting angle. An angular scale 22 is mounted on the top side of the quarter-circle plate 6 and its digits can be read in an enlarged representation by means of a magnifying glass 24.

A nut 26 is welded to the underside of the protrusion 8. Its internal thread engages a portion of the external thread of a clamping screw 28. A handle 30 for manually turning the clamping screw 28 is attached at the lower end of said clamping screw 28, while a tappet 32 is mounted at the other end of the clamping screw 28. The circular, upper surface of the tappet 32 can be brought into and out of contact with the underside of the quarter-circle plate 6 by turning the clamping screw 28. With a sufficiently strong contacting force between the tappet 32 and the quarter-circle plate 6, the contact rails 2, 4 cannot pivot with respect to the protrusion 8 and thus with respect to the tool plane 12. In this way, the contact rails 2, 4 can be fixed at an adjusted pivoting angle.

A friction wheel 38, attached to a pin 34, is mounted rotatably at one end of the protrusion 8 and the circumferential surface of the friction wheel 38 engages a portion of the side surface 40 of the quarter-circle plate 6. By turning at a knurl 36, the quarter-circle plate 6 and thus the contact rails 2, 4 are pivoted at the friction wheel 38 by force transmission and the pivoting angle can be adjusted accurately. The pin 34 alternatively can be mounted in the housing 42.

Within the housing 42, which is rigidly connected to the protrusion 8, are housed a computer 44 and the display 10. The magnifying glass 24 is also inserted in a section of the housing 42. The sensor 20, as well as the sensors 25, 27 of the contact flaps 17, 19 are connected to the input terminals of the computer 44 by means of electric leads in a manner that is not shown here. Electric leads lead from the output terminals of said computer to the display 10. The computer 44 essentially comprises an A/D converter and a microprocessor. All electrical and electronic components of the miter box 1 are supplied with power by a battery 47 accommodated in the housing 42. Alternatively, the electric power supply can be implemented by a connection, by way of a connection plug, to an external electrical network. The display 10 can be switched from angular dimensions to length dimensions by a manual input over a keyboard 46. This dimensioned data can be displayed on the display 10 by means of the electrical signals provided by the computer 44. The keyboard 46 alternatively can have number pads.

In a manner that is not shown here, the contact flaps 17, 19 can be moved on the contact rails 2, 4 with the help of electric step motors. For example, threaded spindles situated inside the contact rails 2, 4 can be driven by step motors fastened to the free ends of the contact rails 2, 4, and the contact flaps 17, 19 engage the threaded spindles in such a way that they are put into motion when the spindles rotate.

A data processing program is stored in the computer 44, by means of which a length specification, taken from the measuring tape 21, 23 of the contact rails 2, 4, is corrected by the angular measure of the pivoting angle, which is taken from the measuring tape 18 disposed along the graduated circle in such a fashion, that the display 10 indicates the actual distance of the contact flap from the saw blade 14. Since the distance of the contact flap from the saw blade 14 changes when the contact rails 2, 4 are pivoted, with the consequence that the length of a workpiece would change upon pivoting, the angular measure of the pivoting angle as well as the measure of the relative position of the contact flap on the contact rail are processed by means of the data processing program, using trigonometric functions and geometric relationships in such a fashion, that the display 10 indicates the actual distance. The operating personnel thus can move a contact flap into a position corresponding to the desired workpiece dimensions, with the contact rails 2, 4 in any arbitrary pivoting position.

In an embodiment not shown here, the desired workpiece length can be entered into the computer by means of a numerical keyboard. When the contact rails 2, 4 are pivoted, the contact flaps are moved automatically by means of step motors into the correct position corresponding to the workpiece dimension, after the computer has determined the corrected distance.

I claim:

1. A double-sided miter box for machine tool panel saws having a driven tool, comprising:

two contact rails (2, 4), which can be moved relative to the driven tool (14) and which are connected to one another so as to enclose a right angle between them and which are jointly mounted pivotably about a rotation axis (16) disposed on an angle bisector near the driven tool (14);

an electrical measurement transducer for measuring; and a display (10) for indicating a pivoting angle of the contact rails (2, 4) relative to a tool plane (12), characterized in that the electric measurement transducer comprises a magnetically coded measuring tape (18), which is disposed about the rotation axis (16) along a graduated partial circle and a sensor (20) which senses the measuring tape (18) without contact therewith, a value measured by the sensor being indicated on the display (10) as an angular measurement of the pivoting angle.

2. The miter box of claim 1, characterized in that the magnetically coded measuring tape (18) is mounted along the graduated partial circle on a surface extending perpendicularly relative to a plane stretched between the contact rails (2, 4).

3. The miter box of claim 1, further comprising a protrusion (8) of the miter box, said protrusion being non-pivotable with respect to the tool plane (12), characterized in that the display (10) and the sensor (20), which senses the measuring tape (18), are disposed at one end of the protrusion (8).

4. The miter box of claim 1, characterized in that the display (10) can be switched from angular dimensions to length dimensions.

5. The miter box of claim 1, further comprising at least one contact flap, which is mounted so as to be movable lengthwise but fixable on a contact rail (2, 4), characterized in that the contact flap has a sensor fastened to it, which senses without contact a measuring tape attached along the respective contact rail (2, 4) and which is connected electrically to the display (10), on which the position of the contact flap relative to the respective contact rail (2, 4) can be indicated.

6. The miter box of at least claim 5, characterized in that each contact flap can be moved on the respective contact rail (2, 4) by means of an electrical step motor.

7. The miter box of claim 6, characterized in that a value of the distance of the contact flap from the tool (14), which can be entered into the computer (44), is processed in the computer (44) by means of the angular measure taken from the measuring tape (20) disposed along the graduated, partial circle, and in that said computer (44) delivers a signal to the step motor, so that in a pivoting position of a contact rail the contact flap of the rail can be moved to the inputted value of the distance of the contact flap from the tool (14).

8. The miter box of claim 7, characterized in that a numerical keyboard is disposed at the display (10), by means of which the value of the entered distance of the contact flap from the tool (14) can be entered manually into the computer (44).

9. The miter box of claim 7, characterized in that a quarter-circle plate (6) is rigidly connected between the contact rails (2, 4).

10. The miter box of claim 9, characterized by a friction wheel (38), which can be operated manually, mounted to a protrusion (8) so that it cannot be pivoted relative to the tool plane and engages a portion of the quarter-circle plate (6) so that the pivoting angle of the contact rails (2, 4) can be adjusted accurately by turning the friction wheel (38).

11. The miter box of claim 5, characterized in that a length value taken from the measuring tape of the contact rail is corrected in a computer (44) by means of the angular measure, taken from the measuring tape (18) that is disposed along the graduated partial circle, in such a fashion that the display (10) indicates the actual distance of the contact flap from the tool (14).

12. The miter box of claim 11, characterized in that the computer (44) and the display (10) are accommodated in a common housing (42).

13. The miter box of claim 1, characterized in that the contact rails (2, 4) can be fixed at a chosen pivoting angle by clamping means.

14. The miter box of claim 1, further comprising a battery power source.

* * * * *